United States Patent
Jauniaux

(12) 
(10) Patent No.: US 6,303,709 B1
(45) Date of Patent: Oct. 16, 2001

(54) CONTINUOUS PROCESS FOR OBTAINING PROPYLENE POLYMERS

(75) Inventor: Marc Jauniaux, Brussels (BE)

(73) Assignee: Solvay Polyolefins Europe-Belgium (Societe Anonyme), Brussels (BE)

(*) Notice: Subject to any disclaimer, the term of this patent is extended or adjusted under 35 U.S.C. 154(b) by 0 days.

(21) Appl. No.: 09/424,849

(22) PCT Filed: May 26, 1998

(86) PCT No.: PCT/EP98/03185

§ 371 Date: Jan. 18, 2000

§ 102(e) Date: Jan. 18, 2000

(87) PCT Pub. No.: WO98/55519

PCT Pub. Date: Dec. 10, 1998

Related U.S. Application Data

(63) Continuation of application No. 09/028,222, filed on Feb. 23, 1998, now abandoned, and a continuation of application No. 08/869,926, filed on Jun. 5, 1997, now abandoned.

(51) Int. Cl.$^7$ ........................................................ C08F 2/34
(52) U.S. Cl. ............................... 526/64; 526/65; 526/116; 526/348.2; 525/247
(58) Field of Search .............................. 526/64, 65, 116, 526/348.2, 901; 525/247

(56) References Cited

U.S. PATENT DOCUMENTS

| | | |
|---|---|---|
| 5,326,835 | 7/1994 | Ahvenainen et al. . |
| 5,610,244 | 3/1997 | Govoni et al. . |

FOREIGN PATENT DOCUMENTS

| | | |
|---|---|---|
| 0 517 183 | 12/1992 | (EP) . |
| 0 574 821 | 12/1993 | (EP) . |
| 0 651 012 | 5/1995 | (EP) . |
| 1 532 231 | 11/1978 | (GB) . |
| WO 88/02376 | * 4/1988 | (WO) . |
| WO 95 22565 | 8/1995 | (WO) . |

OTHER PUBLICATIONS

T. Whelan, Polymer Technology Dictionary, p. 1, 1994.
Database WPI: Section Ch, Week 9423; Derwent Publications Ltd., London, GB; Class A17, AN 94–186419; XP002077571 & JP 06 122724 A (Tosoh Corp.); May 6, 1994.

Patent Abstracts Of Japan; vol. 004, No. 061 (C–009); May 8, 1980 & JP 55 029517 A (Mitsubishi Petrochem Co., Ltd.), Mar. 1, 1980.

* cited by examiner

Primary Examiner—Donald R. Wilson
Assistant Examiner—William Cheung
(74) Attorney, Agent, or Firm—Oblon, Spivak, McClelland, Maier & Neustadt, P.C.

(57) ABSTRACT

A continuous process for obtaining propylene polymers in the presence of a catalytic system of the Ziegler-Natta type containing a catalytic solid comprising chlorine, magnesium and titanium atoms and at least one electron-donor compound, called internal donor, a cocatalyst which is an organoaluminium compound, and optionally an electron-donor compound, called external donor, comprising the following successive stages:

(a) polymerization of propylene in liquid propylene to form, per g of titanium in the catalytic solid, from 11000 to 28000 g of a prepolymer chosen from among the homopolymers of propylene, and (b) gas-phase polymerization of propylene in one or more successive fluidized-bed reactors and in the presence of the prepolymer (a), of propylene, optionally in the presence of one or more other monomers chosen from among the α-olefins containing from 2 to 12 carbon atoms to produce a final propylene polymer whose fraction of particles of diameter smaller than 125 μm (FP) is at most 10 wt %.

A process for initiation of a continuous process for obtaining propylene polymers, comprising a stage of polymerization of propylene in liquid propylene end a stage of gas-phase polymerization in one or more successive fluidized-bed reactors and in the presence of the polymer obtained from the first stage, wherein the gas-phase polymerization reactor or reactors do not contain polymer particles in suspension.

10 Claims, No Drawings

CONTINUOUS PROCESS FOR OBTAINING PROPYLENE POLYMERS

This application was filed as PCT International application number PCT/EP98/03185 on May 26, 1998, and is a continuation of U.S. application Ser. No. 08/869,926, filed Jun. 5, 1997, and U.S. application Ser. No. 09/028,222, filed Feb. 23, 1998, abandoned.

The present invention relates to a process for gas-phase polymerization of propylene by means of a fluidized bed, and to a process for initiating a gas-phase propylene polymerization process.

It is known that the α-olefins such as propylene can be polymerized in the gas phase, for example in a fluidized bed, by means of an ascending gas stream containing the α-olefin or α-olefins to be polymerized. The gaseous mixture exiting the reactor is generally cooled and supplemented by an additional quantity of α-olefins before being recycled to the reactor. The polymerization is most often carried out using a catalytic system of the Ziegler-Natta type, introduced continuously or semicontinuously into the fluidized-bed reactor.

These catalytic systems are generally obtained by combining, on the one hand, a catalytic solid comprising a compound of a transition metal belonging to Groups IVb, Vb and VIb of the Periodic Table and, on the other hand, a cocatalyst comprising an organometallic compound of a metal of Groups Ia, IIa or IIIa. Furthermore, in the case of propylene polymerization, these catalytic systems most often contain an electron-donor compound known as an external electron donor, which is used to increase the stereospecificity of the catalyst.

It is also known that a prepolymerized catalytic solid, or in other words a catalytic solid that has previously undergone a polymerization stage more generally referred to as the prepolymerization stage, can be used in the gas-phase polymerization reactor.

For example, U.S. Pat. No. 4,721,763 describes a process for gas-phase polymerization of α-olefins in a fluidized-bed reactor in the presence of a catalytic solid of spheroidal morphology and narrow particle-size distribution that has been prepolymerized so as to form a prepolymer which has the form of a powder of particles whose mass-average mean diameter is between 80 and 300 $\mu$m and which contains $2 \times 10^{-3}$ to $10^{-1}$ mmole of titanium per gram. According to that document, prepolymerization is performed in two stages, the first being performed in a liquid hydrocarbon and the second in suspension in the monomer or in the gas phase. Such a process, which is particularly time-consuming and complex to use, is difficult to operate profitably on the industrial scale.

In addition, document WO 88/02376 describes a process for polymerization of α-olefins comprising a first stage of liquid-phase polymerization under conditions such that the weight ratio of the α-olefin or α-olefins to the catalytic solid is at least equal to 6000:1, the residence time is from 10 to 400 seconds and the temperature is from 20 to 100° C., preferably 40 to 80° C., and a second stage of gas-phase polymerization at a temperature of 40 to 150° C., performed in the presence of the reaction mixture obtained from the first stage. The accomplishment of this first stage leads to an increase in catalytic productivity but does not influence the stereospecificity of the catalytic system. In addition, the morphology of the polymer powders obtained is still unsatisfactory and such a process is difficult to control.

There has now been found, for gas-phase polymerization of α-olefins in a fluidized bed, a process with which propylene polymers can be obtained with particularly high yield and stereospecificity and which does not exhibit such disadvantages.

To this end, the present invention relates to a continuous process for obtaining propylene polymers in the presence of a catalytic system of the Ziegler-Natta type containing a catalytic solid comprising chlorine, magnesium and titanium atoms and at least one electron-donor compound, called internal donor, a cocatalyst which is an organoaluminum compound, and optionally an electron-donor compound, called external donor, comprising the following successive stages:

(a) polymerization of propylene in liquid propylene to form from 11000 to 28000 g, per g of titanium in the catalytic solid, of a prepolymer which is a homopolymer of propylene, and (b) gas-phase polymerization of propylene in one or more successive fluidized-bed reactors and in the presence of the prepolymer, optionally in the presence of one or more other monomers chosen from among the α-olefins containing from 2 to 12 carbon atoms, to produce a propylene polymer whose fraction of particles of diameter smaller than 125 $\mu$(FP) is at most 10 wt %.

The process according to the present invention makes it possible to obtain homopolymers of propylene as well as copolymers thereof containing preferably at least 50 wt % of propylene and more particularly at least 75 wt % of propylene.

The propylene copolymers are most often chosen from among the random or block copolymers of propylene.

The comonomers are preferably ethylene and/or 1-butene.

Preferably, the polymers obtained according to the process of the invention are such that their FP is at most 6 wt %, preferably at most 2 wt %. Polymers whose FP is smaller than 0.5% are particularly advantageous. The very particularly preferred propylene polymers do not contain particles whose diameter is smaller than 125 $\mu$m.

The titanium content of the homopolymers obtained according to the process of the invention is most often at most $3 \times 10^{-5}$ mmol per g, this content being preferably at most $3 \times 10^{-5}$ mmol per g for the copolymers of propylene and ethylene, while the titanium content of terpolymers of propylene, ethylene and butene is most often at most $9 \times 10^{31}$ 5 mmol of titanium per g of polymer.

The catalytic solids that are usable according to the invention generally contain chlorine, magnesium, titanium and at least one internal donor as main constituents. Preferably they contain at least 10 wt % of magnesium. The catalytic solids containing at least 15 wt % of magnesium are particularly well suited. The magnesium content of the catalytic solids that are usable according to the present invention is most often at most 30 wt %. Magnesium contents of at most 25 wt % being most advantageous. The catalytic solids that are usable according to the invention preferably also contain at least 1 wt % of titanium.

This titanium content is most often at most 10 wt %. Good results are obtained when this content is at most 5 wt %. In addition, these solids contain from 20 to 80 wt % of chlorine, preferably from 50 to 75 wt % of chlorine. The internal donor is most often chosen from among the ethers, the esters, the amines, the amides, the phenols, the ketones and the oxygen-containing organic compounds of silicon. The internal donors are preferably chosen from among the carboxylic esters and more particularly from among the aromatic carboxylic diesters. The esters of phthalic acids are particularly well suited, and thereamong the di-n-butyl and di-isobutyl phthalates yield particularly good results. The total quantity of the internal donor or donors is most often from 2 to 30 wt %, most often from 5 to 20 wt % of the catalytic solid.

Particularly well suited catalytic solids are those which contain from 2 to 4 wt % of titanium, from 17 to 23 wt % of magnesium, from 55 to 75 wt % of chlorine and from 8 to 19 wt % of an internal donor chosen preferably from among the di-n-butyl and di-isobutyl phthalates.

These catalytic solids can be deposited in or on organic or inorganic supports. As examples of organic supports there can be cited the preformed polymers, and of inorganic supports the oxides of silicon, aluminium, magnesium, titanium and zirconium and mixtures thereof The catalytic solids used preferentially in the scope of the present invention have the form of particles whose mean weight-average diameter is preferably at least 5 $\mu$m, more particularly at least 10 $\mu$m and more particularly at least 20 $\mu$m.

These preferred catalytic solids are additionally such that their mean weight-average diameter is at most 150 $\mu$m, more particularly at most 100 $\mu$m.

Catalytic solids having a mean diameter of at most 50 $\mu$m being more particularly preferred.

Preferably the catalytic particles have an overall spherical shape.

Such catalytic solids are known to the person skilled in the art, and the description of the processes for obtaining them is beyond the scope of the present application.

The cocatalyst is preferably chosen from among the compounds represented by the formula $AIR_3$, in which R represents a hydrocarbon radical chosen from among the straight-chain alkyl radicals containing from 1 to 8 carbon atoms.

The external donor may be different from or identical to the internal donor. When the internal donor is chosen from among the diesters of aromatic carboxylic acids, the external donor is advantageously chosen from among the organic silicon compounds having the general formula $R_n Si(OR')_{4-n}$ wherein n is an integer of from 0 to 3 and R and R' are, each independently, alkyl, alkenyl, aryl or cycloalkyl groups.

The components of the catalytic system are generally used in quantities such that the mole ratio of the aluminum of the cocatalyst to the titanium of the catalytic solid is at least 10, preferably at least 20 and more particularly at least 30. Furthermore, this ratio is most often at most 500, generally at most 300 and more particularly at most 200.

The quantity of external donor is generally such that the mole ratio of the aluminum of the cocatalyst to the external donor is at least 1, more particularly at least 2. Most often, this ratio is at most 500.

Ratios of at most 150 are well suited, and more particularly ratios of at most 60. Ratios of about 3 to about 40 yield good results.

The process according to the present invention comprises a first stage of polymerization of propylene in liquid propylene (stage a), called the prepolymerization stage.

This prepolymerization stage is generally performed in a loop reactor containing liquid propylene. Most often, the operating conditions of this loop reactor are such that the ratio by weight of propylene to the catalytic solid is at least 500 and preferably at least 700. This ratio by weight is most often at most 4000, and more particularly at most 3000.

Good results are obtained when the ratio by weight of propylene to the catalytic solid is at least 700 and at most 3000.

The pressure in the loop reactor is generally higher than that of the gas-phase polymerization reactor. This pressure is most often higher by at least $0.1 \times 10^5$ Pa, preferably higher by at least $0.5 \times 10^5$ Pa than that of the gas-phase polymerization reactor. Furthermore, it is most often at most $60 \times 10^5$ Pa and advantageously at most $45 \times 10^5$ Pa.

According to the present invention, the quantity of prepolymer produced in this stage is larger than or equal to 11000 g per g of titanium present in the catalytic solid and smaller than or equal to 28000 g per g of titanium present in the catalytic solid. Preferably, the quantity of prepolymer is at least 13000 g per g of titanium present in the catalytic solid. Prepolymer quantities of at most 18000 yield particularly good results. Most often, the quantity of prepolymer produced is at least 13000 g and at most 18000 g per g of titanium present in the catalytic solid.

The operating conditions used in stage (a) are generally such that the temperature is most often at least 0° C. and more particularly at least 7° C. Furthermore, the temperature of this stage is generally lower than or equal to 30° C., most often lower than or equal to 25° C. The mean residence time of the catalyst particles in this stage is most often at least 10 minutes. Residence times of at most 90 minutes are well suited.

Within the scope of the present invention, two types of operating conditions are advantageously used.

According to the first variant, the temperature of stage (a) is at most 17° C., and advantageously at most 15° C. This temperature is most often at least 0° C. and more particularly at least 7° C. When stage (a) is used according to this variant, the mean residence time of the catalyst particles in this stage is at least 15 minutes and more particularly at least 20 minutes. Furthermore, this residence time is most often at most 90 minutes and more particularly at most 60 minutes. Most often, the temperature of stage (a) is at least 7° C. and at most 17° C. and the mean residence time in this stage is at least 15 minutes and at most 90 minutes.

Temperatures of 11 to 13° C. are particularly will suited. Residence times of 30 to 50 minutes yield particularly good results.

A particularly advantageous process is such that the temperature of stage (a) is from 11 to 13° C. and the mean residence time in stage (a) is from 30 to 50 minutes.

According to the second variant, the temperature of stage (a) is higher, thus permitting shorter residence times. In this case, the temperature of stage (a) is higher than 17° C. and preferably at least 18° C. Temperatures of at most 25° C. are well suited and more particularly those of at most 22° C. According to this variant, the residence times in the reactor are at least 10 minutes, preferably at least 15 minutes. Residence times shorter than 40 minutes are well suited. Most often, stage (a) according to the second variant is performed under conditions such that the temperature of stage (a) is higher that 17° C. and at most 25° C. and the mean residence time in this stage is at least 10 minutes and at most 40 minutes. Residence times of 15 to 25 minutes yield particularly good results. Particularly advantageous results are obtained when this temperature is 19 to 22° C., a temperature of about 20° C. being particularly well suited.

The preferred processes of this type are those in which the temperature of stage (a) is from 19 to 22° C. and the mean residence time of this stage is from 15 to 25 minutes.

It is noted in general that the use of temperatures below 0° C. necessitates longer residence times and larger cooling systems to remove the heat liberated by the polymerization reaction. The capital expenditures necessary to construct such a stage are therefore greater, and it is more difficult to produce a profit therefrom. In addition, a decrease in stereospecificity of the catalyst may be observed at these temperatures, and this may lead to problems of sticking and/or of clogging of the feed means of the gas-phase reactor.

It is further noted that the use of a temperature higher than or equal to about 20° C. ultimately leads to an increase of the fraction of particles of small diameter. Such a phenomenon already appears when the polymerization temperature of stage (a) is higher than 17° C. In particular, it has been observed that the use of such prepolymerization temperatures leads to an increase of the fraction of polymer particles of diameter smaller than 250 μm. The fraction of polymer particles of diameter smaller than 125 μm could also increase.

Moreover, it appears that the use of temperatures higher than 17° C. also leads to a decrease of the stereospecificity of the catalyst which may lead to products having less interesting properties. Finally, the use of prepolymerization temperatures higher than 17° C. and specially higher or equal to 20° C. leads to processes which are more difficult to control.

Consequently, the best operating conditions according to the invention are those of the first variant, that is a temperature of stage (a) from 11 to 13° C. and a mean residence time in this stage from 30 to 50 minutes.

The components of the catalytic system are most often introduced in their entirety into the polymerization mixture of stage (a). They may be introduced separately thereinto. It is also possible, however, to bring about precontact between the catalytic solid and the external donor before introducing them together, but separately from the cocatalyst, into the polymerization mixture of stage (a). The duration of this precontact is most often approximately a few seconds, or in other words generally about 1 second to about 10 seconds. The precontact temperature for its part being most often close to the ambient temperature.

This precontact is advantageously effected in the line feeding reactants to the polymerization reactor of stage (a).

The process according to the present invention yields particularly good results when the cocatalyst is introduced separately into the prepolymerization reactor without having been subjected to precontact with the catalytic solid and/or the external donor. Particularly advantageous processes are those in which the cocatalyst on the one hand and the catalytic solid and the external donor on the other hand are introduced into the reactor of stage (a).

According to the present invention, the polymerization in stage (a) may be performed in the absence or presence of hydrogen. In the latter case, the quantity of hydrogen used in stage (a) is most often at least 0.5 g per 1000 kg of propylene introduced into the reactor, preferably at least 1 g per 1000 kg of propylene. Furthermore, the quantity of hydrogen introduced into the polymerization reactor of stage (a) is most often at most 500 g per 1000 kg of propylene. Quantities of at most 100 and more particularly of at most 50 g per 1000 kg of propylene yield good results.

According to the present invention, the polymerization mixture obtained in stage (a) is discharged continuously and directly into the subsequent gas-phase polymerization reactor(s). This discharge can be achieved by any known process, for example by pressure difference, possibly accompanied by a carrier gas or liquid. It is preferably achieved by simple pressure difference between the polymerization reactor of stage (a) and the gas-phase polymerization reactor(s) of stage (b). Most often, this discharge takes place via a simple pipe extending from the polymerization reactor of stage (a) to the gas-phase polymerization reactor of stage (b). It is self-evident that this pipe may include a valve designed to disconnect the two reactors and/or to regulate the pressure in the reactor of stage (a).

The gas-phase polymerization reactor may be any form of fluidized-bed reactor. For example, it may be analogous to the fluidized-bed reactor described in U.S. Pat. No. 4,482,687, or any other fluidized-bed reactor known for the polymerization of olefins. The fluidized bed is generally comprised of particles of polymer of the same nature as that of the polymer to be produced. Consequently, the fluidized bed is comprised of growing polymer particles and of prepolymer particles fluidized by means of an ascending gas stream passing through the fluidized bed. This gas stream contains the monomer or monomers to be polymerized and possibly one or more inert gases such as nitrogen and/or one or more $C_2$ to $C_6$ alkanes. The essential elements of the polymerization reactor are the reactor proper, the gas diffuser, the gas-circulation means, which comprises in particular a compressor and a heat-exchange means, and the polymer powder discharge system. The gas-phase polymerization reactor or reactors operate most often at temperatures of about 40 to about 150° C., preferably of about 50 to about 120° C. The pressure prevailing in the interior of these reactors is most often at least $8 \times 10^5$ Pa, more particularly at least $16 \times 10^5$ Pa. Pressures of at most $45 \times 10^5$ Pa, preferably at most $40 \times 10^5$ Pa, are particularly well suited. The fluidization velocity of the gases in the gas-phase polymerization reactor is most often at least 0.1 m/s, more particularly at least 0.2 m/s. Fluidization velocities of at most 1 m/s are particularly well suited, and thereamong those of at most 0.7 m/s. When more than one gas-phase reactor are used, it is evident that they may operate in different conditions.

The process according to the present invention, and more particularly the use of the preferred prepolymerization conditions described hereinabove, make it possible to obtain, with particularly high yields, propylene polymers having high isotacticity and containing few, and most often no fine particles. Such polymers are particularly easy to handle and transport by pneumatic conveyors. In addition, substantial reduction in fouling of the filters used in the different items of equipment used for handling thereof is observed. Similarly, the risk of formation of polymer films on the walls of the gas-phase polymerization reactor is diminished. In addition, it is noted that the fraction of final polymers which are soluble in hydrocarbon solvents such as xylene is lower than that of similar polymers obtained according to processes different from those of the invention.

The process according to the present invention makes it possible in particular to obtain, with particularly high yields, propylene homopolymers having both a xylene-soluble fraction and a particularly short crystallization time. These particular homopolymers have both a melt flow index (MFI—measured per ASTM Standard D 1238-1986) of from 1 to 50 g/10 minutes, more particularly from 3 to 40 g/10 minutes, and a xylene-soluble fraction (XS) measured per ASTM Standard 3029-90 lower than or equal to 2.4 wt % more particularly lower than or equal to 2 wt % relative to the total homopolymer.

It is noted most often that this xylene-soluble fraction is higher than or equal to 1 wt %, more particularly higher than or equal to 1.2 wt % relative to the total polymer.

Such polymers contain few catalytic residues. This content of catalytic residues is generally such that the chlorine concentration, expressed in mg per kg of polymer, is lower than 35. In addition, the residual titanium content is most often lower than or equal to 2 mg per kg of polymer, the residual content of magnesium being most often lower than or equal to 30 mg per kg of polymer and that of aluminium lower than or equal to 40 mg per kg of polymer. Furthermore, these homopolymers are most often such that their molecular-weight distribution is such that the ratio of weight-average molecular weight to number-average molecular weight measured per ASTM Standard 3593-86 is higher than or equal to 3 and lower than or equal to 5.

Such homopolymers have good extrudability and are particularly well suited for the fabrication of threads, fibers or slit film yarns. They may also be processed at particularly high speeds without formation of smoke.

Surprisingly, the process according to the invention also makes it possible to obtain, directly at the exit of the polymerization reactors, propylene block copolymers containing from 85 to 75 wt % of a polymer (i) chosen from among the homopolymers of propylene and the random copolymers thereof containing less than 5 wt % of one or more other monomers chosen from among the α-olefins containing from 2 to 12 carbon atoms and 15 to 25 wt % of a random copolymer of propylene (ii) containing from 40 to 65 wt % of ethylene, the said block copolymer having an MFI higher than or equal to 35 g/10 minutes, generally higher than or equal to 40 g/10 minutes and more particularly higher than 45 g/10 minutes. These block copolymers are generally obtained by using a process according to the invention which comprises, in addition to the prepolymerization stage (a), at least two successive gas-phase polymerization stages in the course of which the polymers per (i) and (ii) are prepared.

Such copolymers, which by virtue of their composition and of their MFI contain large fractions of noncrystalline and/or sticky polymers, were heretofore considered impossible to obtain directly by polymerization, because their poor flowability caused problems of sticking and/or clogging of the polymerization reactors and/or of their discharge means. As a result, such block polymers were heretofore obtained by mixing polymers obtained separately and having adequate MFI values and composition or by depolymerization of block copolymers having the desired composition and a lower MFI. Such depolymerization is most often achieved by extrusion in the presence of free-radical generators such as peroxides. The process according to the invention makes it possible in particularly advantageous manner to obtain these polymers directly at the reactor exit without having to subject them to subsequent depolymerization. Thus the block polymers obtained according to the process of the invention have the advantage of having a yellowness index, measured per ASTM Standard D 1 925-70, which is very low, typically lower than 0 and more particularly lower than −1. Furthermore, they are free of odors originating from peroxide residues, and their organoleptic properties are particularly good. It is also observed that their polymer fraction which is soluble in hexane at 50° C. (measured per CFR Standard 21/177.150, Method 3 ii c-s) is most often lower than 10 wt %, typically lower than 8 wt % and more particularly lower than 7 wt %.

Furthermore, these particular block copolymers are generally characterized by a particularly favorable rigidity/impact-strength compromise. It is observed, in fact, that their flexural modulus measured per ASTM Standard D790 on the basis of specimens conditioned per ISO Standard 291 is most often higher than 170000 psi (1173 MPa) and more particularly higher than 175000 psi (1207 MPa). In addition, their impact strength, characterized by the resistance to multi-axial impact as measured by the Gardner method of ASTM 3029-90 at −20° C., is most often higher than 30 in.lbf and more particularly higher than 40 in.lbf.

By virtue of their properties, these block copolymers necessitate lower injection pressures and can be processed at higher speed (shorter time for mold filling and for cooling of the molded articles). They are therefore particularly easy to process.

Finally, it has been found that the use of continuous processes comprising a first polymerization step in liquid propylene followed by gas-phase polymerization in fluidizing-bed reactor(s) makes it possible to initiate the polymerization reaction by using the fluidized-bed reactor or reactors devoid of polymer particles in suspension.

Consequently, the present invention also relates to a process for initiation of a continuous process for obtaining propylene polymers in the presence of a catalytic system of the Ziegler-Natta type containing a catalytic solid comprising chlorine, magnesium and titanium atoms and at least one internal electron-donor compound, a cocatalyst which is an organoaluminium compound, and optionally an external electron-donor compound, comprising the following successive stages:

(a) polymerization of propylene in liquid propylene, optionally in the presence of one or more other monomers chosen from among the α-olefins containing 2 to 12 carbon atoms to form from 40 g to 45000 g, preferably 800 g to 35000 g and more particularly 2000 g to 30000 g of prepolymer per gram of titanium present in the catalytic solid, and (b) gas-phase polymerization of propylene in one or more successive fluidized-bed reactors and in the presence of the prepolymer, optionally in the presence of one or more other monomers such as defined hereinabove, wherein the gas-phase polymerization reactor or reactors do not contain polymer particles in suspension.

Very particularly preferred polymerization conditions for stage (a) correspond to the formation of 11000 g to 28000 g of prepolymer and more particularly 13000 g to 18000 g of prepolymer per g of titanium in the catalytic solid. This prepolymer is most often chosen from among the homopolymers of propylene.

The initiation process according to the invention is advantageously used for the production of propylene polymers whose fraction of particles of diameter smaller than 125 μm (FP) is at most 10 wt %.

According to the process of the invention, initiation of the polymerization reaction is achieved by introducing, into the gas-phase polymerization reactor or reactors devoid of solid particles, a gas stream whose composition has been chosen beforehand as a function of the grade of the desired polymer to be obtained. The conditions of composition, temperature and pressure of the gas stream are most often the customary polymerization conditions. They are chosen as a function of the grade of the desired polymer to be obtained. The conditions described hereinabove for the continuous polymerization process are particularly well suited. The velocity of the ascending gas stream during the initiation period is preferably equal to or slightly lower than the fluidization velocity during polymerization.

A velocity lower by about 10% than the fluidization velocity yields particularly good results.

The liquid propylene and possibly the other comonomer or comonomers are then continuously introduced into the reactor of the prepolymerization stage (a), which reactor is then connected to the gas-phase polymerization reactor. The temperature conditions of the reactor of stage (a) are those chosen for the prepolymerization reaction. It is most often higher than or equal to 0° C. Furthermore, it is most often lower than or equal to 60° C. This temperature may be reached before or after connection to the gas-phase reactor.

Particularly favorable conditions for the prepolymerization stage (a) are those described hereinabove for the continuous polymerization process.

The different constituents of the catalytic system are then introduced into the prepolymerization reactor, preferably continuously, in such a manner as to initiate the prepolymerization reaction. The conditions of use of these constituents are most often those described hereinabove for the operating conditions of the polymerization process. The polymerization reaction is then continued in the gas-phase reactor or reactors, where the polymer particles grow and accumulate in such a way that they form the fluidized bed. Once the required level of fluidized material has been reached, this reactor or these reactors are discharged continuously or batchwise.

The use of the initiation process according to the invention makes it possible directly to obtain the resins having the required composition and properties. As a result, it makes it possible to decrease or even avoid the nonconforming products that are obtained during periods of initiation of polymerization lines. Since such products are generally of little value, the use of the initiation process according to the invention therefore permits an increase of the economic efficiency of these lines. In addition, such a process makes it possible to dispense with the means necessary for treatment and storage of these products. It is also no longer necessary to undertake storage of powders used during these initiation processes. The use of the process according to the invention also makes it possible to switch quickly and economically from one grade of resin to another simply by stopping the polymerization reaction and then purging the reactor or reactors and reinitiating under the conditions required for fabrication of the new grade.

The following examples are provided to illustrate the invention. In these examples, the meanings of the symbols used, the units expressing the mentioned parameters and the methods for measuring these parameters are explained below.

- P=Catalytic productivity expressed in grams of polymer produced per g of catalyst. This parameter is appraised indirectly on the basis of determination by X-ray fluorescence of the residual titanium content in the polymer
- PSA=Apparent specific weight of the polymer expressed in g/dm$^3$
- MFI=Melt flow index measured under a load of 2.16 kg at 230° C. and expressed in g/10 min (ASTM Standard D 1238-1986)
- I.I.=Isotacticity index of the polymer, appraised by the fraction of polymer insoluble in boiling heptane, expressed in wt %
- FP=Fraction of polymer particles of diameter smaller than 125 $\mu$m expressed in wt % relative to the total polymer
- F250=Fraction of polymer particles of diameter smaller than 250 $\mu$m expressed in wt % relative to the total polymer

EXAMPLES 1–2

A 40-liter double-jacketed loop reactor intended for the polymerization of stage (a) is filled with liquid propylene. Therein there is introduced a catalytic solid containing 2.8 wt % of titanium and sold under the trade name THC CB4 by TOHO TITANIUM and containing titanium, magnesium and chlorine. This catalytic solid is introduced into the reactor in the form of a suspension in KAYDOL® mineral oil and after precontact of about 1 second with the external donor, which in this particular case is cyclohexylmethyldimethoxysilane. The weight ratio of liquid propylene to solid catalyst is about 2000. The cocatalyst, which is triethylaluminium, is introduced into the loop reactor in a quantity such that the mole ratio of the aluminium to the titanium of the catalytic solid is 200 and such that the mole ratio of the aluminium to the external donor is 30. The operating conditions of this reactor are summarized in Table 1 below. The reaction mixture obtained from this reactor is continuously discharged from the loop reactor into a fluidized-bed reactor in which the polymerization of stage (b) is performed. The operating conditions of the gas-phase reactor as welt as the characteristics of the polymers obtained are also presented in Table 1 below.

TABLE 1

|  | Examples | |
|---|---|---|
|  | 1 | 2 |
| Stage (a) | | |
| Temperature (° C.) | 11–12 | 19–20 |
| Pressure (MPa) | 3.5 | 3.5 |
| Residence time (minutes) | 43 | 25 |
| Propylene flowrate (kg/h) | 35 | 50 |
| Hydrogen flowrate (g/h) | 0.1 | 0.1 |
| Prepolymer (g/g of catalytic solid) | 400 | 400 |
| Stage (b) | | |
| Temperature (° C.) | 65 | 65 |
| Residence time (hours) | 2 | 2 |
| Pressure (MPa) | 2.8 | 2.8 |
| Polymer properties | | |
| P | 25500 | 28000 |
| MFI | 12 | 11 |
| I.I. | 97.1 | 96.7 |
| PSA | 400 | 410 |
| FP | 0 | 0 |
| F250 | 0 | 0.5 |

EXAMPLES 3 and 4

Examples 1 and 2 were repeated except that the polymerization reaction is initiated with the gas-phase reactor devoid of polymer particles. These tests lead to the same results without initiation periods leading to non conforming products.

EXAMPLE 5R

Example 1 was repeated except that the prepolymerization stage (a) is omitted. Such test leads to the formation, with a productivity P of 23300, of a polypropylene having a PSA of 390, an I.I. of 95.9, an MFI of 9, an FP of 1.3 and an F250 of 4.3.

What is claimed is:

1. A continuous process for obtaining propylene polymers in the presence of a catalytic system of the Ziegler-Natta type containing a catalytic solid comprising chlorine, magnesium and titanium atoms and at least one internal electron-donor compound, a cocatalyst which is an organoaluminium compound, and optionally an external electron-donor compound, comprising:

(a) polymerizing propylene in liquid propylene, at a temperature of at least 7° C. and at most 17° C. with a mean residence time of at least 15 minutes and at most 90 minutes, to form from 11000 to 28000 g, per g of titanium in the catalytic solid, of a prepolymer which is a homopolymer of propylene, and then (b) gas-phase polymerizing propylene in one or more successive fluidized-bed reactors and in the presence of the prepolymer from (a), optionally in the presence of one or more other monomers chosen from among the α-olefins containing from 2 to 12 carbon atoms, to produce a final propylene polymer whose fraction of particles of diameter smaller than 125 μm (FP) is at most 10 wt %.

2. The process according to claim 1, wherein the final propylene polymer contains less than 0.5% of particles whose diameter is smaller than 125 μm.

3. The process according to claim 1, wherein (a) is performed in a loop reactor containing liquid propylene.

4. The process according to claim 3, wherein the ratio by weight of propylene to the catalytic solid is at least 700 and at most 3000.

5. The process according to claim 1, wherein the quantity of propylene homopolymer produced in (a) is at least 13000 g and at most 18000 g per g of titanium present in the catalytic solid.

6. The process according to claim 1, wherein the temperature in (a) is from 11 to 13° C. and the mean residence time in (a) is from 30 to 50 minutes.

7. The process according to claim 1, wherein the cocatalyst on the one hand and the catalytic solid and the external donor on the other hand are introduced into the reactor in (a).

8. The process according to claim 1, applied to the fabrication of propylene homopolymers having a melt flow index, MFI, measured per ASTM Standard D 1238-1986, of from 1 to 50 g/10 minutes and a xylene-soluble fraction measured per ASTM Standard 3029-90 lower than or equal to 2.4 wt % relative to the total homopolymer.

9. The process according to claim 1, applied to the fabrication of propylene block copolymers containing from 85 to 75 wt % of a polymer (i) chosen from among the homopolymers of propylene and the random copolymers thereof which contain less than 5 wt % of one or more other monomers chosen from among the α-olefins containing from 2 to 12 carbon atoms and 15 to 25 wt % of a random copolymer of propylene (ii) containing from 40 to 65 wt % of ethylene, the said block copolymer having an MFI higher than or equal to 35 g/10 minutes.

10. A process for initiation of a continuous process for obtaining propylene polymers in the presence of a catalytic system of the Ziegler-Natta type containing a catalytic solid comprising chlorine, magnesium and titanium atoms and at least one internal electron-donor compound, a cocatalyst which is an organoaluminium compound, and optionally an external electron-donor compound, comprising:

(a) polymerizing propylene in liquid propylene, at a temperature of from at least 7° C. and at most 17° C. with a mean residence time of at least 15 minutes and at most 90 minutes, to form from 11000 g to 28000 g, per gram of titanium present in the catalytic solid, of a prepolymer which is a homopolymer of propylene, and then (b) gas-phase polymerizing propylene in one or more successive fluidized-bed reactors and in the presence of the prepolymer, optionally in the presence of one or more other monomers chosen from among the α-olefins containing 2 to 12 carbon atoms, wherein the gas-phase polymerization reactor or reactors do not contain polymer particles in suspension during the initiation of the polymerization reaction.

* * * * *

UNITED STATES PATENT AND TRADEMARK OFFICE
CERTIFICATE OF CORRECTION

PATENT NO.   : 6,303,709 B1
DATED        : October 16, 2001
INVENTOR(S)  : Jauniaux Page 1 of 1

It is certified that error appears in the above-identified patent and that said Letters Patent is hereby corrected as shown below:

<u>Title page,</u>
Item [57], ABSTRACT, last paragraph, fifth line from the end, "propylene end" should read -- propylene and --.

Signed and Sealed this

Nineteenth Day of March, 2002

Attest:

Attesting Officer

JAMES E. ROGAN
*Director of the United States Patent and Trademark Office*